United States Patent [19]

Fisher et al.

[11] 4,149,411
[45] Apr. 17, 1979

[54] MILK PRODUCTION METER

[75] Inventors: Gene A. Fisher, Lafayette; Raymond E. Umbaugh, Boulder, both of Colo.

[73] Assignee: Umbaugh Electronics, Boulder, Colo.

[21] Appl. No.: 768,129

[22] Filed: Feb. 14, 1977

[51] Int. Cl.² .............................................. G01F 1/10
[52] U.S. Cl. ...................................... 73/198; 73/218; 73/422 R
[58] Field of Search .......... 73/217, 218, 219, 422 TC, 73/198; 177/84

[56] References Cited

U.S. PATENT DOCUMENTS

| | | | |
|---|---|---|---|
| 3,599,607 | 8/1971 | Wallick | 73/217 |
| 4,046,208 | 9/1977 | Strenstrom | 73/217 |

*Primary Examiner*—S. Clement Swisher
*Attorney, Agent, or Firm*—O'Rourke & Harris

[57] ABSTRACT

Fluid, such as milk, is conducted into the meter through an inlet passage and received in a fluid receptacle at least a portion of which is movable with at least a portion of the movement being in response to receipt of the fluid with the fluid then being expelled from the meter through a discharge passage. A sensor senses the movement of the movable portion caused by receipt of fluid in the fluid reservoir and, responsive thereto, provides an electrical signal indicative of the amount of fluid received, which electrical signal is coupled from the meter for utilization purposes. In one disclosed embodiment, a rotating wheel has fluid receptacles at the rim to receive the fluid conducted into the meter with the fluid being later (in the rotation of the wheel) dumped from the receptacle and expelled from the meter through the discharge passage. The wheel is rotatably driven through a collar and shaft having a torsion spring therebetween with the weight of the fluid acting on the torsion spring enabling the shaft to angularly lead the collar by an amount dependent upon the weight of the fluid in the receptacle. This angular lead is sensed and an electrical signal produced that is indicative of fluid flow and/or the weight per unit of time of fluid passing through the meter.

18 Claims, 15 Drawing Figures

MILK PRODUCTION METER

FIELD OF THE INVENTION

This invention relates to a fluid meter and, more particularly, relates to a milk production meter.

BACKGROUND OF THE INVENTION

It is oftentimes desirable to measure fluid flow. Such is the case, for example, where the amount of milk from a cow is to be measured to provide a readily available indication of production.

Devices have heretofore been suggested and/or utilized to measure fluid flow, including devices to measure milk flow, and one such device is shown, for example, in U.S. Pat. No. 3,978,460. Improvements in devices of this type are still thought to be needed or useful, however, and could provide a better production meter that is simple in construction, but yet is dependable and provides a reliable flow indication.

SUMMARY OF THE INVENTION

This invention provides an improved fluid meter that is particularly well suited for use as a milk production meter. The meter is simple, yet dependable and reliable, and provides a readily available indication of production with the meter output being also suitable for other uses, such as, for example, as an input to a computer.

It is therefore an object of this invention to provide an improved fluid meter.

It is another object of this invention to provide an improved milk production meter.

It is still another object of this invention to provide an improved fluid meter that is simple, yet dependable in providing reliable flow indications.

It is yet another object of this invention to provide an improved fluid meter that senses fluid flow and provides an indication based thereon.

It is another object of this invention to provide an improved fluid meter that has fluid receiving means with a movable portion that is moved in response to receipt of fluid with the movement being sensed to provide an electrical signal indicative of fluid flow.

It is still another object of this invention to provide an improved fluid meter for sensing milk flow and responsive thereto providing an electrical signal indicative of milk production.

It is another object of this invention to provide an improved fluid meter that includes a receptacle for receiving fluid with said receptacle being displaced due to the weight thereof, which displacement is sensed to provide an electrical signal indicative of fluid flow.

It is yet another object of this invention to provide an improved milk production meter that includes a rotating wheel with fluid receptacles at the rim to receive fluid conducted through the meter with the wheel being driven through a collar and shaft connected by a torsion spring with the angular displacement between the collar and shaft due to the weight of the fluid in the receptacle being sensed by sensing means providing an output indicative of said fluid in said receptacles.

It is still another object of this invention to provide an improved milk production meter that includes an annular trough with a discharge passage therein, which trough is mounted for displacement due to milk within the trough, as well as sensing means to sense the displacement and provide an electrical signal indicative of milk production as measured by milk flow through said meter.

It is yet another object of this invention to provide an improved fluid meter that utilizes a piston with a cylinder to sense fluid flow.

It is still another object of this invention to provide an improved fluid meter that includes a piston within a cylinder with said piston being moved in opposite axial directions by fluid flowing through said meter and said piston movement being sensed and responsive thereto an indication provided of fluid flow.

It is yet another object of this invention to provide an improved milk production meter having a pair of chambers formed in opposite sides of a piston positioned within a cylinder with the piston being moved in opposite axial directions by milk flowing into one chamber of the meter while movement of the piston simultaneously expels milk from the other chamber of the meter, the movement of the piston being sensed and responsive thereto an indication of milk production being provided.

With these and other objects in view, which will become apparent to one skilled in the art as the description proceeds, this invention resides in the novel construction, combination, and arrangement of parts substantially as hereinafter described and more particularly defined by the appended claims, it being understood that certain changes in the precise embodiment of the herein disclosed invention are meant to be included as comes within the scope of the claims.

BRIEF DESCRIPTION OF THE DRAWINGS

The accompanying drawings illustrate three complete embodiments of the invention according to the best mode so far devised for the practical application of the principles thereof, and in which.

DESCRIPTION OF THE INVENTION

Figure 1:
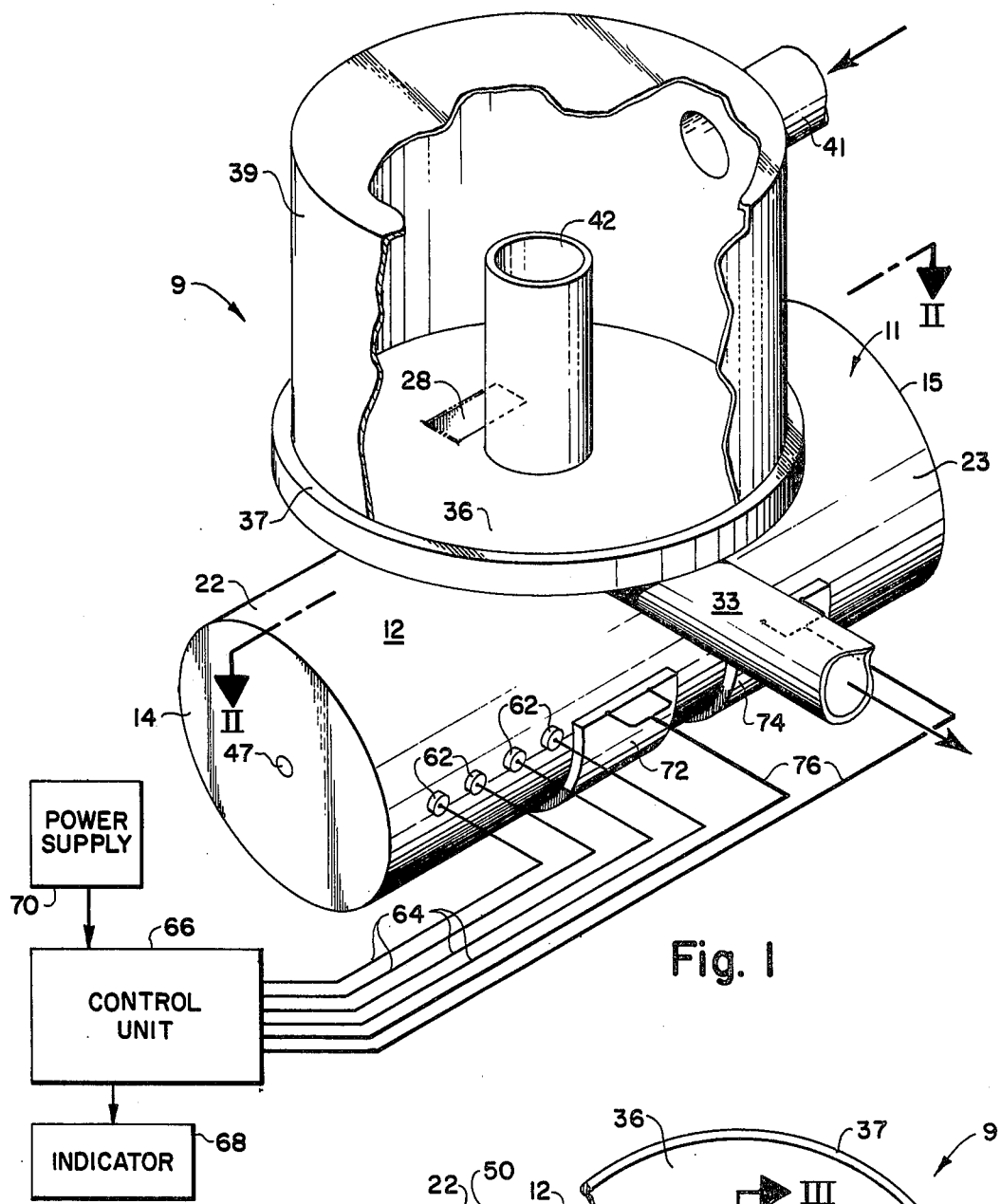
FIG. 1 is a perspective view of a first embodiment of the milk production meter of this invention.

Referring now to the drawings, one embodiment of the milk production meter 9 of this invention is shown in FIG. 1 to include a cylinder 11 having a body portion 12 and two closed end walls 14 and 15. Although not shown, end 15 is preferably removable to facilitate access to the cylinder.

A piston 17 is received within the cylinder with the diameter of the piston being slightly smaller than that of the cylinder so as to establish a sealing relationship therebetween but yet allowing sliding movement of the piston with the cylinder in opposite axial directions along the axes of the cylinder and piston. Opposite ends 19 and 20 of the piston, in conjunction with the opposite end portions 22 and 23 of the cylinder, respectively, define a pair of chambers 25 and 26.

The volume of chambers 25 and 26 will increase as the piston is moved from the associated end wall of the cylinder forming that particular chamber (i.e., end wall 14 for chamber 25 and end wall 15 for chamber 26) and will, of course, decrease as the piston is moved toward the associated end wall. Since piston 17 is movable within the cylinder between the defined chambers, one chamber will increase in volume as the other decreases in volume. The minimum volume of each chamber is achieved when the piston is adjacent to the associated end wall of the cylinder forming the chamber and maximum volume is achieved when the piston is at the end wall opposite to the associated end wall of the cylinder forming the chamber.

Figure 2:
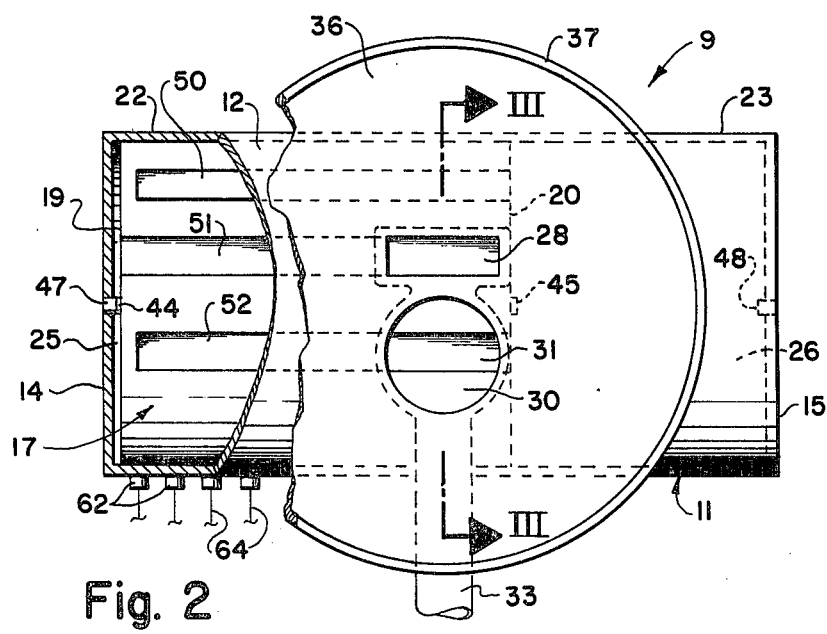
FIG. 2 is a sectional view taken through lines II—II of FIG. 1.

A milk inlet passage 28 opens into cylinder 11 centrally of the body portion 12 and is slightly radially offset from the top of the cylinder as shown best in FIG. 2. As also shown best in FIG. 2, inlet conduit, or passage 28 is preferably rectangular in cross-section although other configurations might be used if desired.

A milk outlet passage 30 also opens into cylinder 11 centrally of the body portion 12 as shown best in FIG. 2. As also shown best in FIG. 2, outlet conduit, or passage, 30 is preferably cylindrical with a smaller rectangular opening 31 actually opening into the cylinder itself. A milk outlet pipe 33 opens from the side of passage 30 and is connectable with a conventional milk line (not shown).

At the top of passages 28 and 30 is located a circular support base 36 having a flange 37 at the outer edge. Passages 28 and 30 terminate in openings in base 36. A cylindrical bowl, or reservoir, 39 is received on base 36 with the diameter of the bowl at the bottom being slightly less than that of flange 37 so that a gasket (not shown) between the base and/or the inner edge of the flange establishes a seal between the bottom of the bowl and the base when the bowl is in position on the base. Bowl 39 is preferably closed except at the bottom and has a milk inlet pipe 41 connectable with conventional milk tubing (not shown) near the top for introduction of milk into the bowl. A standpipe 42 extends upwardly within bowl 39 and communicates with outlet passage 30 for overflow and air bypass purposes.

Piston 17 is cylindrical and preferably of a length slightly greater than one-half the length of the body portion 12 of cylinder 11. It was found, for example, in a working embodiment of this invention, that a cylinder of about 6½ inches in length was successfully used with a piston of about 3½ inches in length with the diameter of the piston being about 2⅜ inches and the internal diameter of the cylinder being slightly greater.

Figure 4:
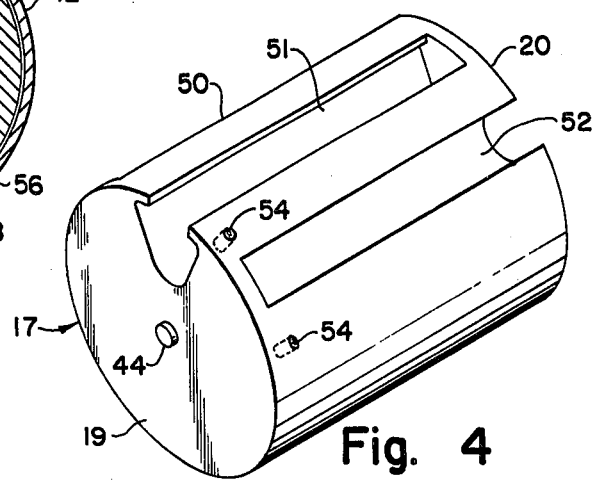
FIG. 4 is a perspective view of the piston utilized in the milk production meter as shown in FIG. 1.
Figure 5:
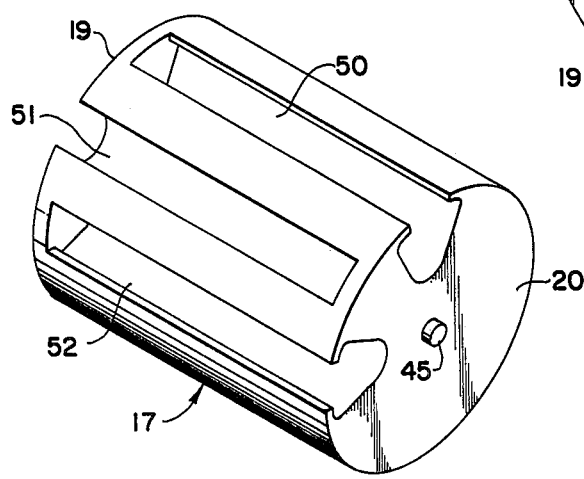
FIG. 5 is an opposite perspective view of the piston as shown in FIG. 4.
Figure 6:
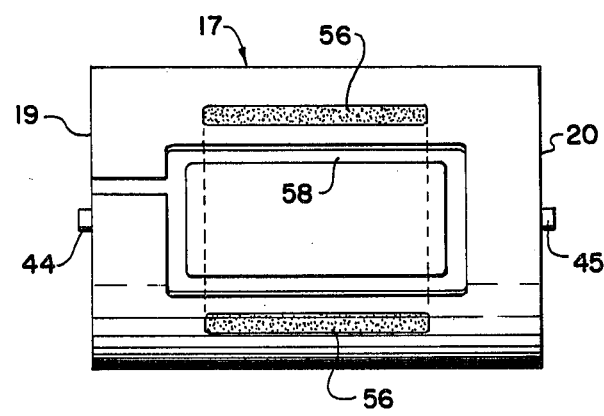
FIG. 6 is a bottom view of the piston as shown in FIGS. 4 and 5.

As shown best in FIGS. 4 through 6, each of opposite ends 19 and 20 of piston 17 has an outwardly extending spacer pin (numbered 44 and 45, respectively) thereat which cooperates with an inwardly directed pin (numbered 47 and 48, respectively) in the end walls 14 and 15 of the cylinder. Engagement between pins 44 and 47 establishes the minimum volume of chamber 25 and the maximum volume of chamber 26, while engagement between pins 45 and 48 establishes the minimum volume of chamber 26 and the maximum volume of chamber 25.

Figure 3:
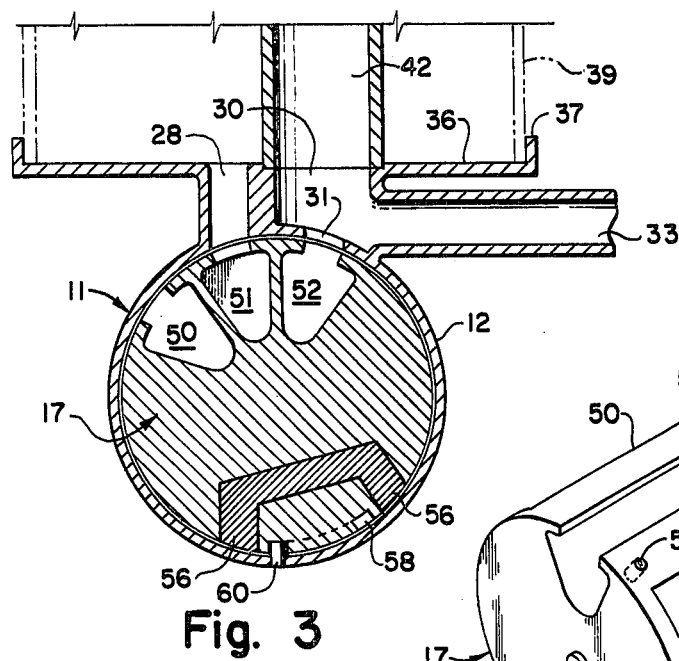
FIG. 3 is a cross-sectional taken through lines III—III of FIG. 2.

Piston 17 has three passages, or notches, 50, 51 and 52 therein each of which is of generally triangular cross-section as shown best in FIGS. 3 through 5, with the opening in the cylindrical body portion being smaller than that of the notch itself. Notch 51 is open at end 19 of the piston and closed at end 20, while notches 50 and 52 are open at end 20 of the piston and closed at end 19. As shown in FIG. 3, the notches are spaced about the piston so that one notch 51 is brought into communication with the milk inlet passage 28 while a second notch 52 is brought into communication with the milk outlet passage 30-31. After rotation of the piston, however, notch 51 is brought into communication with the outlet passage 30-31 while the third notch 50 is brought into communication with the inlet passage 28.

As can be seen from FIG. 3, notch 51 opens into chamber 25 and notches 50 and 52 open into chamber 26. Thus, chamber 25 is either in communication with the inlet or outlet passage in the cylinder through notch 51 while chamber 26 is either in communication with the inlet or outlet passage in the cylinder through notches 50 and 52.

One or more magnets 54 are positioned in the piston 17 adjacent to the notches as shown by dotted lines in FIG. 4. In addition, a large magnet 56 is positioned in the bottom of the piston as shown best in FIGS. 3 and 6.

Piston 17 has a track 58 therein at the bottom as shown in FIG. 6. This track receives an inwardly extending pin 60 at the bottom of the cylinder, or housing, and determines the rotation and maximum amount of axial directional displacement of the piston within the cylinder. The extension of the track to end 19 of the piston allows the piston to be easily removed from the cylinder.

A series of Hall effect switches 62 are positioned at the outer wall of the body portion of the cylinder to sense movement of the magnets 54 in the piston. Leads 64 from these switches are connected with a control unit 66 which causes an output to be displayed on indicator 68, the control unit also being connected to a power supply 70. Control unit 66 can be conventional and can, for example, merely sense switch operation and responsive thereto cause an indication that movement of the piston has occured which can then be displayed on an indicator, either as to an amount of milk flow or as an indication of milk production, usually in pounds. If desired, control unit 66 can be more complex, and can be utilized in conjunction with a computer and/or a digital display to give the desired information.

Rotation of the piston 17 is controlled by electromagnets 72 and 74 positioned at the outside of the cylinder body portion (as shown in FIG. 1). Leads 76 from the electromagnets are connected with the control unit and are energized in conjunction with sensing the position of the piston when it reaches either end of the cylinder (the Hall effect switches can be used for this purpose if desired).

In operation of the milk production meter as shown in FIGS. 1 through 6, milk (as for example from a cow being milked) is conducted through milk inlet 41 into bowl 39. The milk in the bowl flows through passage 28 and notch 51 (when piston 17 is in the position as shown in FIGS. 2 and 3) into chamber 25. As chamber 25 is filled with milk, piston 17 moves to allow an increase in the volume of chamber 25 until chamber 26 is decreased to a minimum volume (i.e., when end wall 20 of piston 17 is adjacent to end wall 15 of cylinder 11). Piston 17 is then rotated by electromagnet 74 and notch 51 is brought into communication with outlet pasage 30-31 while notch 50 is brought into communication with inlet passage 28.

Milk in the bowl then flows into chamber 26 through notch 50 and this causes the piston to shift toward the other end of the cylinder. As the piston moves, the milk in chamber 25 is forced from chamber 25 and flows from the unit through outlet passage 30-31 and outlet tube 33.

When piston 17 reaches the other end of the cylinder, the positioning of the piston is sensed, and electromagnet 72 rotates the piston in the opposite direction to bring notch 51 back into communication with the inlet passage to the milk bowl while notch 52 is brought back into communication with outlet passage 30. Now milk flow from the bowl flows into chamber 25 through notch 51 to move the piston and this causes milk to be expelled from chamber 26. In this manner, the piston is automatically alternately moved in opposite axial directions as long as milk remains in the bowl.

As piston 17 is moved in each axial direction, the movement is sensed by the Hall effect switches. Control unit 66 is responsive to the closure of the Hall effect switches to indicate piston movement. Since a predetermined amount of milk flows through the meter at each movement of the piston from one end of the cylinder to the other, an indication of either milk flow or milk production (usually in pounds) can be readily indicated as on a digital indicator or the like. If desired, the information can also be supplied to a computer.

A second embodiment of the invention is shown in FIGS. 7 through 10. As shown, the milk production meter, indicated by the numeral 80, includes a container 82 having a fluid receptacle 84 and displacement sensor unit 86 therein.

Container 82 is formed by a disc-like base 88 and an enclosure 89 (which could be domed) with the enclosure being releasably mounted and sealed against the periphery of the base by conventional means such as screws (not shown).

Enclosure 89 has a fluid inlet passage 91 therein in the upper portion, which passage is connectable with a line such as a milk line leading from a milker apparatus (not shown).

Figure 10:
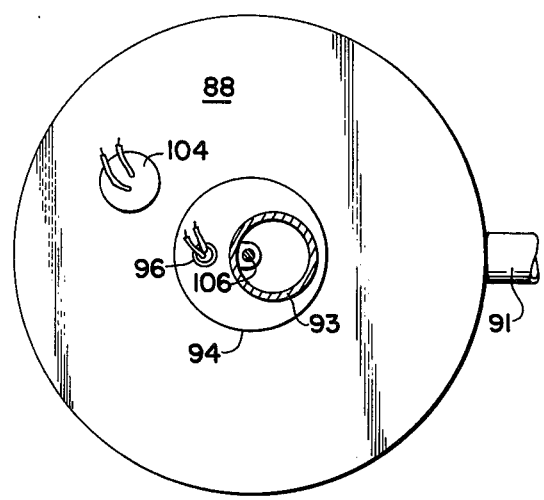
FIG. 10 is a bottom view of the milk production meter shown in FIG. 7.

As shown best in FIG. 10, base 88 has a fluid outlet, or discharge, passage 93 extending downwardly from the central portion thereof and also may include a shoulder 94 at said central portion.

A mounting post 96 is fixed to the base 88 and extends in a vertically upward direction therefrom into the closed container 82. Post 96 is slightly offset from the center of the base and extends downwardly for a short distance below the base through shoulder 94. As can be seen in FIG. 10, post 96 is preferably hollow (or has a central bore therein) to allow passage of electrical leads 98 from the sensor unit 86 to be connected externally of the meter.

Figure 8:
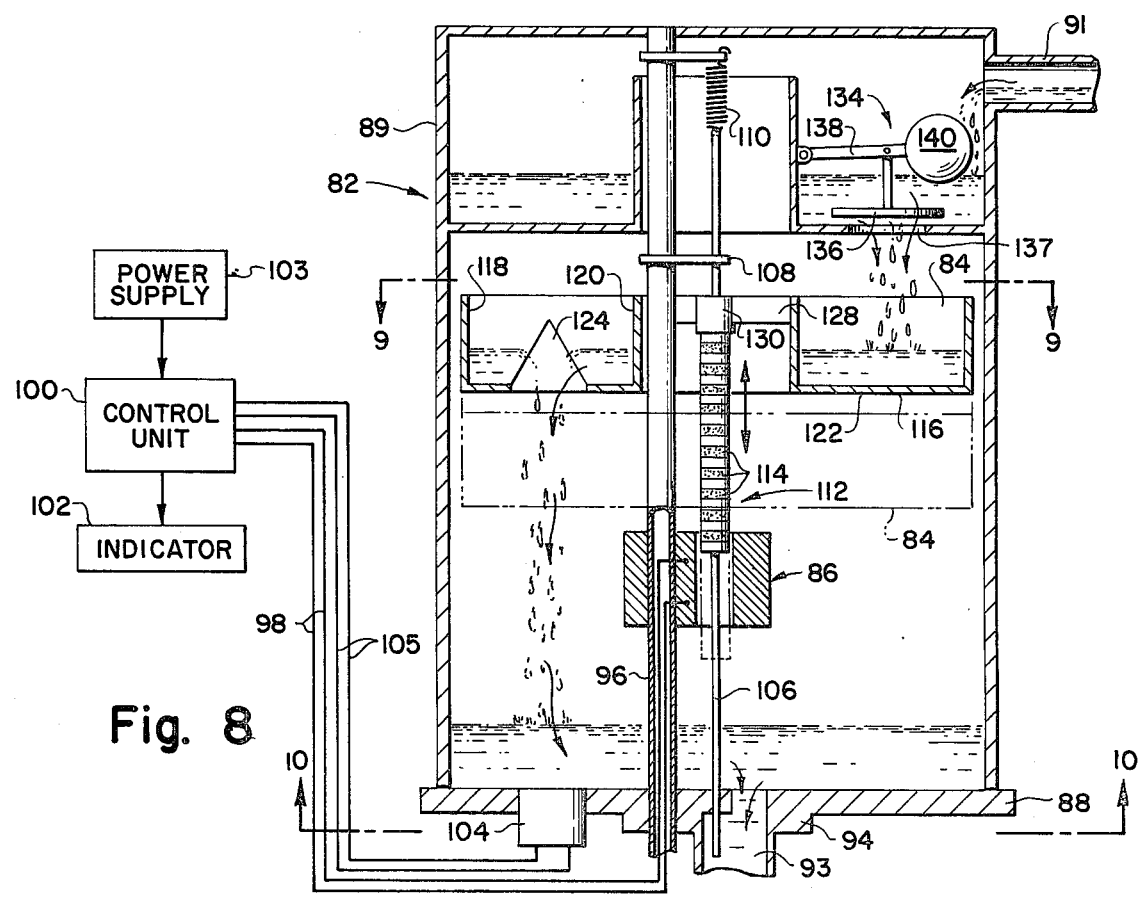
FIG. 8 is a side view of the milk production meter shown in FIG. 7.

As shown in FIG. 8, electrical leads 98 are connected to a conventional control unit 100 where the electrical signals are conventionally utilized to drive an indicator 102 (such as a digital display) to indicate the sensed milk production as shown by milk flow through the meter. Control unit 100 is also conventionally connected to a power supply 103 as also indicated in FIG. 8. The sensed milk production could also be utilized for computer input, if desired. A temperature probe 104 can be conveniently positioned at the enclosure to sense the temperature of milk within the enclosure. As indicated, such a probe may be placed in the base 88 with the electrical leads 105 from the probe being connected to control unit 100.

A mounting rod 106 is connected on post 96 within the container 82 by means of a pair of bushings, or guides, 108. As shown, the rod 106 is constrained to movement in opposite axial directions, i.e., upwardly and downwardly in a vertical path. A spring 110 is connected between the top of the rod 106 and post 96 to bias the rod against movement in a vertically downward direction toward base 88 of the container. As shown, rod 106 can extend through the discharge passage 93 in the base to facilitate movement of the rod.

Indicia 112 is placed on rod 106 for enabling sensing of the displacement of the rod. As shown, this indicia may consist of a plurality of concentrically spaced rings 114 of ferro-magnetic material.

Fluid receptacle 84 is fixed to the rod 106 and thus constrained to common movement (i.e., constrained to upward or downward movement in a vertical path). Receptacle 84 includes an upwardly opening trough 116 having an outer wall 118, an inner wall 120, a bottom 122, and a triangularly-shaped discharge passage 124 at the end of the trough.

Figure 7:
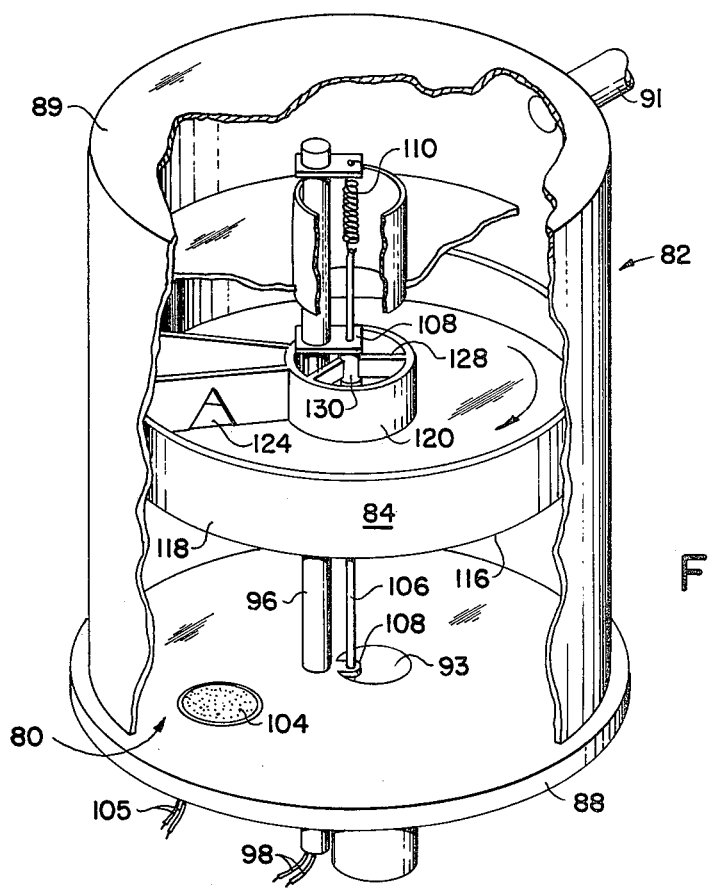
FIG. 7 is a perspective view of a second embodiment of the milk production meter of this invention.

As can best be appreciated from FIGS. 7 and 8, trough 116 slants slightly downwardly at the bottom towards discharge passage 124 so that milk in the trough is directed to the discharge passage where milk (or other fluid) in the trough is continuously discharged from the receptacle.

Figure 9:
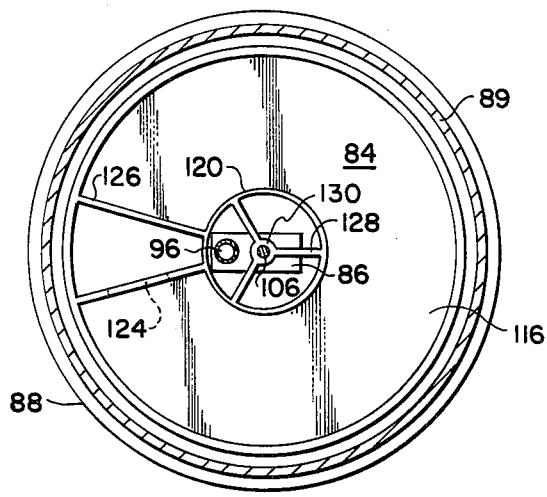
FIG. 9 is a top view of the milk production meter shown in FIG. 7.

As can be seen best in FIG. 9, trough 116 includes a baffle 126 near the discharge passage at the high side of the trough, and receptacle 84 is fixed to rod 106 by a plurality of arms 128 extending to a hub 130 surrounding the rod.

Sensor unit 86 is fixed to mounting post 96 so that the sensor unit is contiguous to the indicia 112 on rod 106. Sensor unit 86 may be conventional and can include, for example, a plurality of Hall effect switches that sense the passage of rings 114 (i.e., indicia 112) and generate therefrom electrical signals which are coupled from the unit through leads 98 extending through the interior of post 96. Other types of sensors could be utilized and this invention is not meant to be limited to the type of sensor shown. For example, force sensing could be utilized instead of displacement sensing and could be accomplished by the use of strain gages, piezoelectric units, or optical units.

In operation of the second embodiment of the milk production meter is shown in FIGS. 7 through 10, fluid (such as milk) is conducted through the inlet passage 91 into the interior of container 82 at the top portion thereof. This milk is directed into receptacle 84, which container may have conventional baffles and the like (not shown) to assure that the fluid is conducted into the receptacle. As shown, a fluid inlet control 134 may also be utilized, and may include, for example, a valve 136 operating in conjunction with aperture 137 in an upper wall within the chamber with valve 136 being mounted on pivot rod 138 which has a float 140 on the free end. This same arrangement, while not shown, can also be utilized in the other embodiments of the invention. The fluid received in the receptacle passes through the trough until it reaches the discharge passage 124 and then flows from the receptacle to the meter outlet opening 93.

While the fluid is in the receptacle, however, the weight of the fluid causes the receptacle to be displaced downwardly due to gravitational forces overcoming the bias exerted by spring 110. As the receptacle moves, or is displaced, the indicia 112 of rod 106 moves relative to the sensor unit 86. This movement is sensed and an electrical signal produced that is coupled to control unit 100. By compensating for the normal flow of fluid from the receptacle through the discharge passage, the then prevailing rate of flow can be established as can the rate of flow by mass or production such as milk production. This can then be readily indicated, as on a digital display, for example, or can be coupled to a computer as an input thereto. If the rate of flow, or production, increases or decreases, this will be sensed by movement of the receptacle which causes the rod 106 to be moved upwardly or downwardly to thus cause the indicia to be moved relative to the sensor and the electrical signal generated by the sensor unit will be indicative thereof.

The now preferred embodiment of the invention is shown in FIGS. 11 through 14. The meter as shown, could be used for fluids such as milk, but is also usable with solids, particularly of small particle size. As shown, the meter is a milk production meter, indicated by the numeral 146, and includes a container 148 having a fluid receptacle 150 and sensor unit 152 (see FIG. 14) therein.

Figure 11:
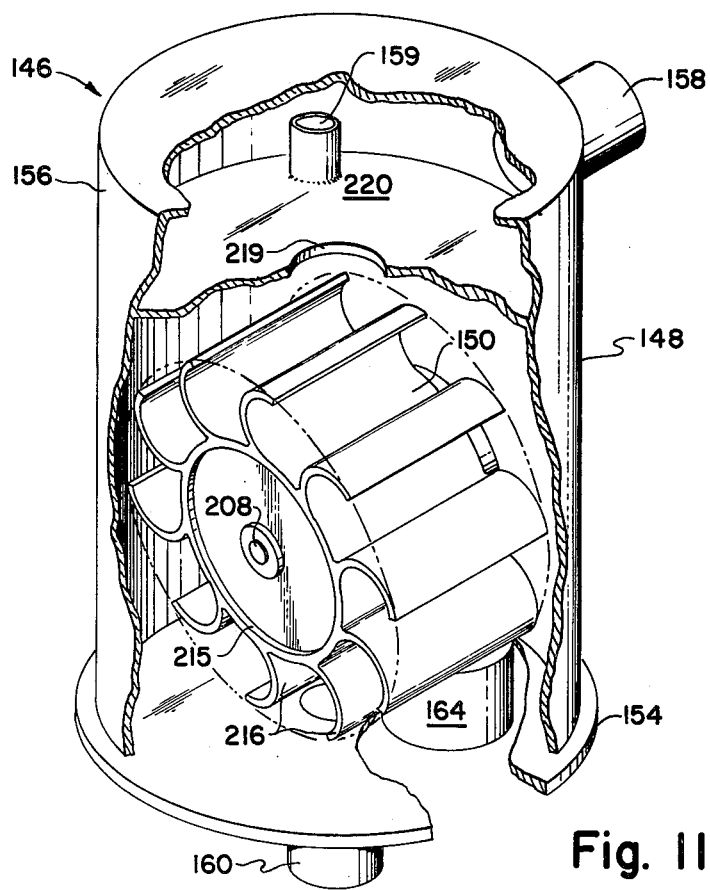
FIG. 11 is a perspective view of the now preferred embodiment of the milk procuction meter of this invention.
Figure 12:
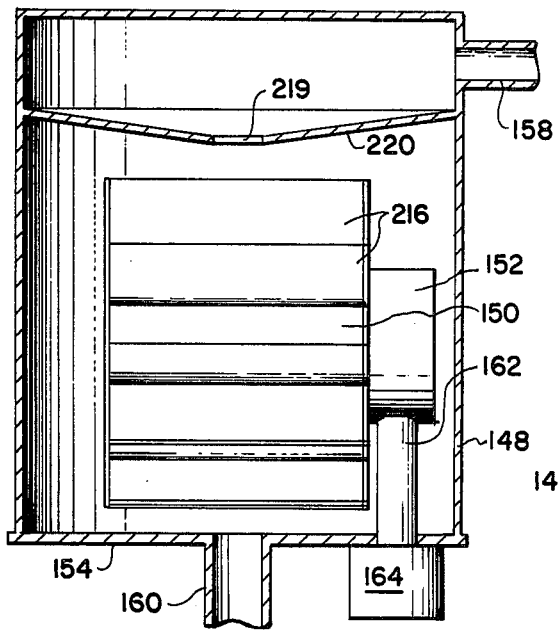
FIG. 12 is a side view of the milk production meter shown in FIG. 11.
Figure 13:
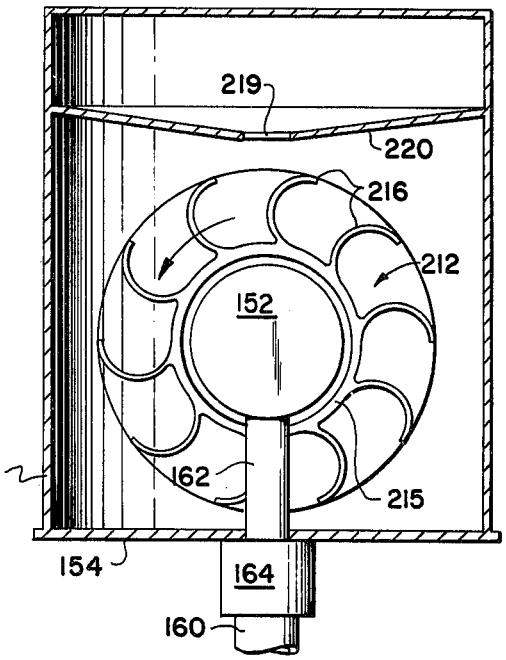
FIG. 13 is a side view of the milk production meter shown in FIG. 12 but rotated 90°.

As shown in FIGS. 11 through 13, container 148 is formed from a disc-like base 154 and an enclosure 156 (which may be a domed enclosure) with the enclosure being releasably mounted and sealed against the periphery of the base by conventional means such as screws (not shown). Thus, container 148 is similar to containers 82 and 39 shown in the previously disclosed embodiments.

Enclosure 156 has a fluid inlet passage 158 therein at the upper portion, which passage is connectable with a line such as a milk line leading from a milker apparatus (not shown). While not shown, it is to be realized that the upper portion of the enclosure could have baffles and/or a fluid control such as a float unit or the like. One or more air by-passes 159 are also provided in the upper portion of the enclosure (such air by-pass units are also preferably includable in the other embodiments described herein).

As shown in FIGS. 12 and 13, base 154 has a fluid outlet, or discharge, passage 160 extending downwardly from the central portion thereof (the discharge passage could be positioned other than in the central portion, if desired).

Sensor unit 152 is mounted within enclosure 156 and is enclosed in housing 162 which extends downwardly and is mounted on base 154. Below base 154, a motor 164 is mounted to drive the sensor unit through drive shaft 166 mounted in bearings 167 (see FIG. 14). The motor and drive could be otherwise positioned, of course, such as, for example, at the side of the enclosure adjacent to the sensor and speed reduction means or the like could be utilized as needed or desired.

Figure 14:
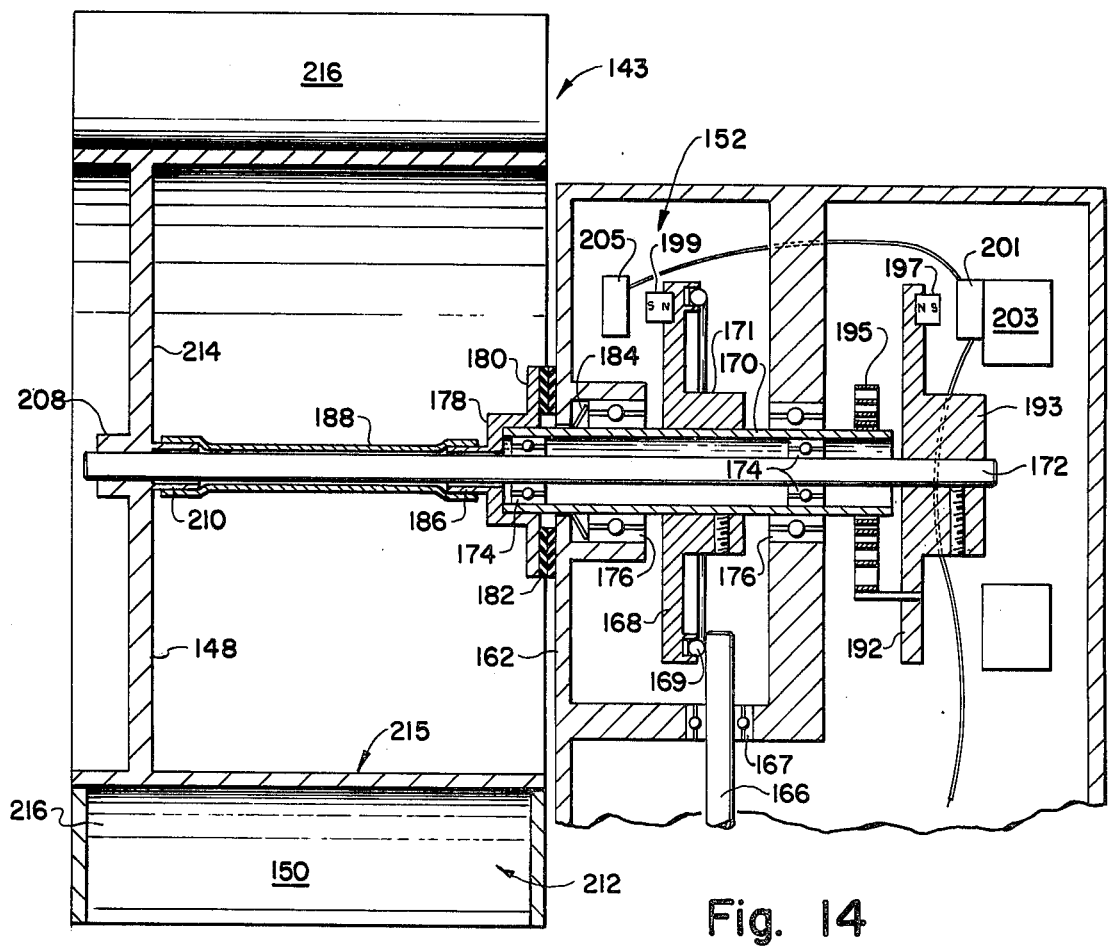
FIG. 14 is a sectional view of the milk production meter as shown in FIG. 12.

As shown in FIG. 14, drive shaft 166 rotates drive ring 168 through friction ring 169. Drive ring 168 is fixed to collar 170 at hub 171, and collar 170 has a shaft, or rod, 172 mounted therein by means of bearings 174, with collar 170 being mounted on housing 162 by means of bearings 176. Thus, both the shaft and collar are mounted to be freely rotatable with respect to one another (except where constrained by a torsion spring or the like as brought out hereinafter) and with respect to housing 162.

As shown, collar 170 extends through the housing sidewall and has a cap 178 mounted thereon, which cap has a shoulder 180 with a seal 182 between the shoulder and the housing sidewall. Seal pressure is exerted by a Belville spring 184 within the housing.

Cap 178 (over the end of collar 170) also has an annular lip 186 adjacent to rod 172 (but allows the rod to rotate with respect thereto). A silicon torsion seal 188 is then placed over the lip and this seal extends along the length of the rod 172 to the weighing wheel 148.

Rod, or shaft, 172 has an annular ring 192 fastened thereto at hub 193 at the rear of the rod (within housing 162) so that annular ring 192 is constrained to rotate with rod 172. A torsion spring 195 extends between the rod 172 and collar 170 just forwardly of annular ring 192, as shown in FIG. 14 (other types of biasing might be used if desired).

Annular ring 192 also has a permanent magnet 197 connected at the outer end portion of the ring and the magnet therefore rotates with rod 172. Drive ring 168 likewise has a permanent magnet 199 connected to its outer periphery and this magnet is therefore constrained to rotation with collar 170.

Hall effect switch 201 is fastened to adjustable ring 203 (which in turn is fastened to the housing 162) and Hall effect switch 205 is fastened to housing 162. Hall effect switch 201 is positioned to sense rotation of magnet 197, while Hall effect switch 205 is positioned to sense rotation of magnet 199.

Weighing wheel 148 has a hub portion 208 fastened to the front end portion of rod 172 and a lip 210 extending inwardly adjacent to the rod with the lip being covered by silicon seal 188.

The rim 212 of the wheel is connected to the hub by spikes, or arms, 214 extending to cylinder 215 which is part of the rim. Receptacles 216 are formed by a series of arcuate walls (each of a hook-like cross-section) and these walls extend outwardly from the cylinder (see FIGS. 11 and 13). The thus formed receptacles are open at the back side with respect to the direction of travel of the rim as indicated in FIG. 13. As shown, fluid such as milk received in each receptacle is maintained therein (the ends of the receptacle are closed) until the weighing wheel is rotated about 180° from the fill position to discharge the fluid at the bottom of the enclosure. As shown, milk in the upper portion of the enclosure (received through conduit 158 in the enclosure) is directed through an aperture 219 in horizontal upper wall 220 so that the fluid is introduced into the receptacles at the fill position at the top of travel of the wheel. The fluid is then discharged from the enclosure through the discharge opening 160 when the receptacle has reached the dump position at the bottom of rotation of the wheel. Baffles and/or a fluid inlet control can, of course, be utilized in conjunction with this embodiment in the same manner as described with respect to the previous disclosed embodiments. As shown in the drawings, the weighing wheel rotates about a horizontal axis and rotates in a vertical plane, while the rod and collar are both horizontally aligned and concentrically positioned with respect to one another.

In operation of the embodiment of the invention as shown in FIGS. 11 through 14, collar 170 is driven by motor 164 through drive shaft 166 to rotate at a constant speed great enough to insure that the receptacles, or cups, do not overflow and that the receptacles, or cups, do not dump the fluid therein until the receptacle is very near the bottom of travel. While the speed may obviously vary for different applications, a rotational speed of about 50 rpm has been found to be practical for a milk production meter.

In connection with the fluid in the receptacles, it is important to note that any material that was weighed by being within the receptacles on the downward path in the receptacles (i.e., before dumping) and not then dumped, will automatically be deducted from the weight as the receptacles are moved upwardly (i.e., from the dumping position towards the fill position at the top of the rotational travel of the weighing wheel).

Since the collar is rotated at a constant speed, shaft 172 will operate at this speed when driven through the torsion spring 195 so long as the receptacles are empty (provision is made so that the shaft 195 cannot rotate more slowly than does collar 170 where influenced by the torsion spring).

When the receptacles receive fluid, however, shaft 172 moves angularly ahead of the collar due to the weight of the fluid in the receptacles. Since the rotation of collar 170 is sensed by Hall effect switch 205 (and thus serves as a reference since the collar is rotated at a constant speed) and the rotation of shaft 152 is sensed by Hall effect switch 197, angular displacement between the collar and shaft is sensed and an electrical signal produced that is indicative of the time difference therebetween. This time difference is dependent upon the weight of the material within the receptacles (the weight of the material acts upon the torsion spring providing the drive between the collar and shaft) so that the greater the time difference the greater will be the weight of material within the receptacles. Thus, the electrical output signals indicative of the weight of the material passing through the meter and hence is indicative of the rate of flow by mass or production (such as milk production). This electrical output can then be conducted through electrical leads from the Hall effect switches which leads are connected with a control unit (not shown) in the same manner as described in connection with the other embodiments of the invention described herein; and can be utilized in a display or as an input to a computer, for example.

While Hall effect switches have been described herein, it is to be realized that other sensors might also be utilized. For example, an optical encoder could be utilized to sense shaft and collar positioning, as could magnetic encoders, potentiometers (with or without analog to digital conversion), or force sensing such as through the use of strain gages or piezoelectric units. Also a plurality of Hall effect switches could be utilized and spaced and supported as desired.

A milk sampling unit 223 (see FIG. 15) can also be utilized in this invention. As shown, the milk sampler is connected with a milk line 226 (which can attach to an inlet or outlet part of the milk production meter). The sampler could also be connected with the milk production meter itself (by being connected to the base of the container, for example).

Figure 15:
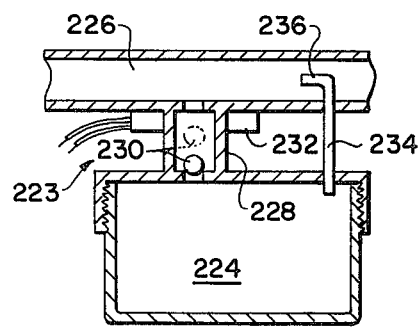
FIG. 15 is a sectional view of a milk sampler that may be used in the milk production meter of this invention.

As shown in FIG. 15, the unit 223 includes a sampling reservoir 224 connected with line 226 through a passage 228 which has a ball valve 230 therein. Ball valve 230 is controlled by electromagnet 232 to raise the ball as needed to allow a milk sample to be diverted to the reservoir 224. An air return 234 with discharge 236 extends from reservoir 224 back to line 226. Electromagnet 232 could be operated, for example, from the control unit to cause a sample of milk to be collected as needed or at specific intervals.

The invention is not meant to be limited to the exact configurations or structures shown, and could be modified as would be apparent to one skilled in the art.

In view of the foregoing, it can be appreciated that this invention provides an improved meter that is well suited for measuring milk flow and indicating milk production.

What is claimed is:

1. A fluid meter, comprising:
    inlet means for receiving a predetermined fluid;
    fluid receiving means for receiving said fluid from said inlet means, said fluid receiving means including a movable member at least a portion of which is movable in response to receipt of said fluid from said inlet means, said moveable member providing a fluid retaining area receiving fluid with said fluid retaining area formed at least in part by a wheel that is rotated to enable filling of said fluid retaining area and discharge of fluid from said fluid retaining area as said wheel is rotated, and with said wheel being rotated by a pair of shafts that are angularly displaceable with respect to one another by an amount dependent upon the fluid at said fluid retaining area;
    outlet means for receiving fluid from said fluid receiving means and discharging the same from said meter;
    sensing means for sensing the movement of said movable member caused by said fluid received at said fluid retaining area with said movement being sensed by sensing said angular shafts and responsive thereto providing an electrical signal indicative of the amount of fluid received by said meter; and
    means electrically connected with said sensing means for coupling said electrical signal from said meter for utilization purposes.

2. The fluid meter of claim 1 wherein a plurality of receptacles are mounted about the periphery of said wheel, and wherein said sensing means senses the fluid within all of said receptacles.

3. The fluid meter of claim 1 wherein said sensing means includes magnetic sensing means.

4. The fluid meter of claim 1 wherein said inlet means and said outlet means are connectable in a milk line, and wherein said sensing means includes providing an electrical signal indicative of milk production.

5. The fluid meter of claim 1 wherein said meter includes sampler means for sampling fluids passing through said meter.

6. The fluid meter of claim 5 wherein said sampler means includes a reservoir having a passage therefrom connectable with fluid passing through said meter with said passage having valve means therein for controlling passage of said fluid into said reservoir.

7. A weighing meter, comprising:
    an inlet for receiving materials;

at least one receptacle for receiving materials that are received through said inlet and later discharging the same;

an outlet for receiving materials from said receptacle and discharging the same from said meter;

drive means for driving said receptacle to alternate movement between a material fill position and a material discharge position, said drive means including a first driven unit and a second driven unit that is connected with said first driven unit through weight responsive means responsive to the amount of material in said receptacle; and sensing means for sensing relative movement between said first and second driven units and responsive thereto providing an electrical signal indicative of the weight of material in said receptacle.

8. The meter of claim 7 wherein said meter includes a plurality of receptacles mounted for rotation at the periphery of a rotatable weighing wheel with said material being received near the top of the path of rotation of said wheel and discharged near the bottom of the path of rotation of said wheel.

9. The meter of claim 8 wherein material not discharged by said receptacles as said wheel is rotated will have the weight of such material automatically deducted from the weight of said material sensed by said sensing means.

10. The meter of claim 7 wherein said receptacle is configured to receive substantially all of said fluid at said fill position received by said meter and substantially retain the same until discharged at said discharge position.

11. The meter of claim 7 wherein said inlet receives fluids, and wherein said meter senses the weight of said fluids.

12. The meter of claim 7 wherein said first driven unit of said drive means is a collar mounted for rotation, wherein said second driven unit is a rod mounted for rotation, and wherein said rod is rotatably driven by rotation of said collar through a torsion spring, said torsion spring being said weight responsive means.

13. The meter of claim 12 wherein said rod is concentrically mounted within said collar, and wherein said meter includes a plurality of receptacles mounted on the periphery of a wheel that is constrained to rotation with said rod.

14. A fluid meter, comprising:
an inlet for receiving fluid;
a rotatable weighing wheel having a plurality of receptacles mounted on the periphery thereof, said receptacles receiving fluid from said inlet when in a fill position and discharging fluid when rotated to a discharge position;

an outlet for discharging fluid from said meter when received from said receptacles of said weighing wheel;

a rotatable shaft constrained to rotation with said weighing wheel;

a rotatable collar contiguous to said shaft;

resilient means connecting said shaft and said collar so that said shaft is rotatably driven by rotation of said collar, said resilient means being responsive to the weight of fluid in said receptacles;

drive means for rotating said collar at a substantially constant speed; and sensing means for sensing the angular difference between said collar and said shaft and responsive thereto providing an output signal indicative of the weight of said fluid received by said receptacles.

15. The fluid meter of claim 14 wherein said shaft and collar are concentrically positioned with respect to one another and wherein said resilient means is a torsion spring connected between said collar and shaft.

16. The fluid meter of claim 14 wherein said sensing means includes a first means for sensing rotation of said collar, and a second means for sensing rotation of said shaft to thereby establish said angular differences therebetween.

17. A milk production meter, comprising:
an enclosure having an inlet port at the top portion and an outlet port at the bottom portion;
a rotatable weighing wheel within said enclosure, said wheel having a plurality of receptacles mounted on and spaced about the periphery thereof, said receptacle receiving fluid from said inlet port at the top portion of the enclosure and discharging fluid therefrom through the outlet port at the bottom portion of the enclosure;
a horizontally positioned shaft having said weighing wheel mounted thereon for rotation about a horizontal axis with said weighing wheel being constrained to rotation with said shaft;
a collar concentric with said shaft and freely rotatable with respect thereto;
a torsion spring connected between said shaft and said collar;
drive means for rotating said collar at a constant predetermined speed of rotation;
first and second magnets constrained to rotation with said collar and shaft, respectively; and
first and second sensors adjacent to the path of said first and second magnets, respectively, to sense rotation of said collar and said shaft whereby angular differences therebetween are sensed and an electrical output signal produced indicative of the weight of milk in said receptacles.

18. The milk production meter of claim 17 wherein said collar and shaft extend from a sealed housing within said enclosure, said housing containing said torsion spring, magnets and sensors.

* * * * *